Patented Nov. 28, 1944

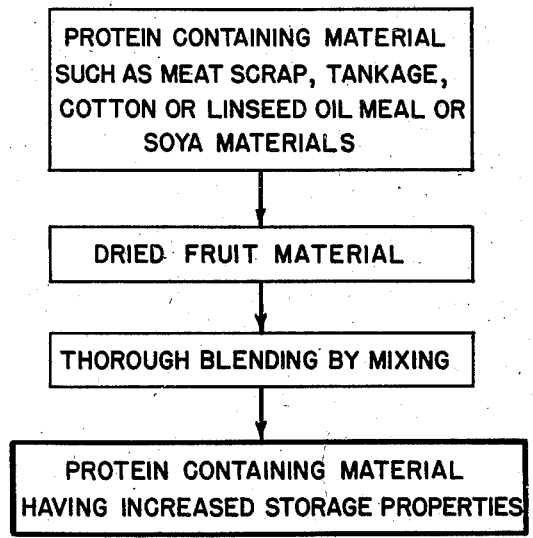
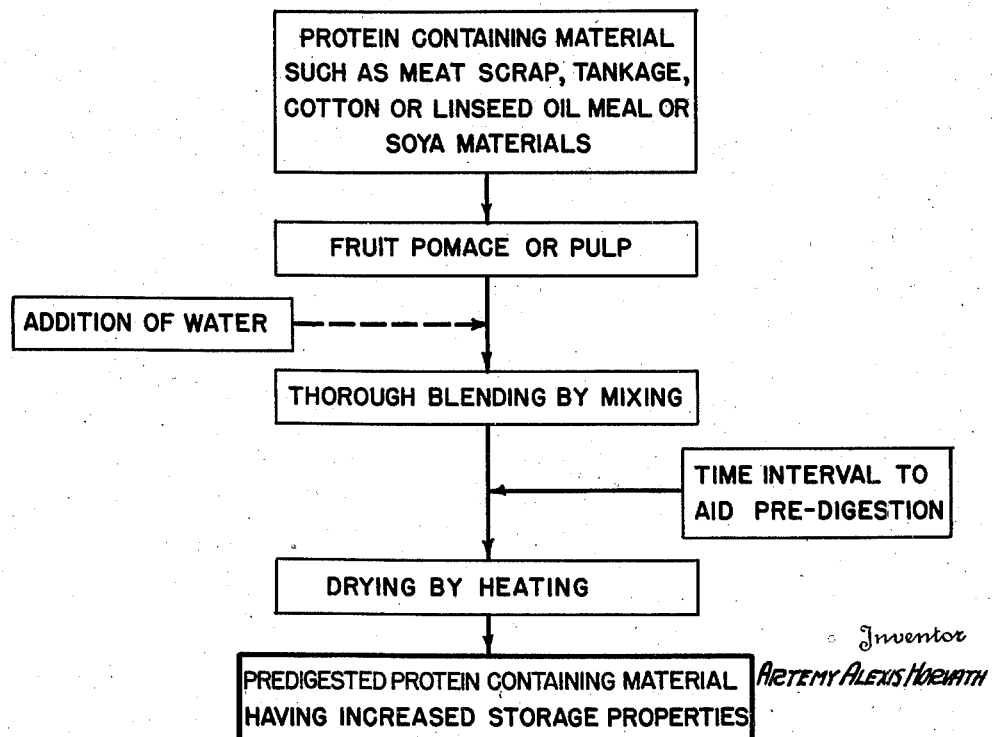

2,363,864

UNITED STATES PATENT OFFICE 2,363,864

PROCESS FOR TREATING PROTEIN CONTAINING MATERIALS WITH FRUIT MATERIALS

Artemy Alexis Horvath, Chambersburg, Pa., assignor to Horvath Laboratories, Inc., Chambersburg, Pa., a corporation of Maryland Application March 13, 1940, Serial No. 323,820

1 Claim. (Cl. 99—99)

This invention relates to the treatment of protein containing material, and more especially to processes by which materials high in protein may be treated with fruit materials, having a pH of less than 7, to prevent deterioration, spoiling, and to promote pre-digestion; and to the product resulting from such treatment.

Hitherto, various fruits, such as tomatoes, peas and carrots, have been added to protein containing materials, especially to boiled soybeans and meat products, in order to increase their nutritive value and taste. However, these recipes are intended for immediate use and, therefore, the fruits are not added for the purposes disclosed in this application nor are processes followed which will prevent deterioration and spoilage or promote pre-digestion of the protein constituents.

One of the objects of this invention is to provide a process for blending materials high in protein, to prevent deterioration and spoilage, with a dried fruit pomace or pulp.

Another object of this invention is to provide a process for blending a material high in protein with a fruit pomace or pulp, and then drying the resulting mixture to prevent deterioration and spoilage, and cause partial pre-digestion.

A further object of this invention is to provide food products from protein concentrates either for human or animal consumption, in which deterioration and spoilage have been prevented by blending the protein containing material with fruit materials.

With these and other objects in view, this invention embraces broadly the concept of blending a selected protein containing material, in divided form of relatively small size, with a fruit material having a pH of less than 7. In one process which may be followed, a dry fruit material is added to the selected protein containing material and the ingredients are thoroughly mixed.

In a second form of this invention, a fruit pulp or pomace is added to the protein containing material and, after the ingredients are thoroughly blended, the resulting mixture is dried. In this process pre-digestion is enhanced if sufficient moisture is present to require a prolonged drying period. The proper moisture content of the blend may be obtained by adding the required amount of water if a sufficient quantity of fruit juices is not present. Preferably, in this second process the mixture is allowed to stand for a period of time before it is subjected to the drying step.

In practicing this invention, any desired type of protein containing material may be selected. For example, a protein containing material, such as meat scrap, tankage, cotton or linseed oil meal, pressed soybean oil meal, ground soybeans, or whole fat soya flours, have been treated successfully. However, in order to enable the fruit material to come into more intimate contact with the selected protein containing material, it is advantageous to reduce the protein containing material to a relatively finely divided condition. Moreover, if the fruit material is reduced in size, the resulting product will be in a more readily usable form.

It is not definitely known why these processes produce the beneficial results which have been mentioned. A plausible explanation of this phenomena may be found in the hydrolyzing effect of the organic acids present in such fruits as tomatoes and apples, the hydrogen ion concentration of which varies from 3.6 to 5.0, on the constituents of the protein containing material, but other unknown factors undoubtedly also play an important role. In any event, the pre-digestion of the protein substances is marked during the heating step when the hydrolytic processes obviously are greatly enhanced. The hydrolytic digestion may be enhanced by heating to a temperature above 212° F. in a closed container.

In the drawing:

Figure 1 discloses the dry method of practicing my invention.

Figure 2 discloses the wet method by which my invention may be practiced.

In practicing this invention by the process shown in Figure 1, the selected proteinic material, if of a type containing oversized portions, is first reduced to a relatively finely divided form and then a quantity of dried fruit pulp or pomace, such as apple or tomato pulp or pomace, is added. Of course, if a proteinic material, such as whole soya flour, cottonseed oil meal, or linseed oil meal, the portions of which are already in comminuted form, is selected, a further reduction in size will be unnecessary. After these ingredients have been thoroughly mixed, the resulting blend may be stored without deterioration or spoilage for a long period of time. If desired, especially when mixtures containing soy, cotton or linseed oil meal are being treated, a small quantity of water may be added to aid in the mixing. In this event, any excess moisture is removed by heating.

In practice, only a small percentage of dried fruit material, varying from 1 to 10 per cent by weight of the total blend, is required to prevent deterioration. The exact proportions employed will, of course, depend upon the type of protein containing material being treated and the form and type of fruit selected. In addition to improving the storage qualities of protein containing materials, this process can be utilized to provide a suitable dry cereal from soya flour.

In order to produce a dry cereal by this method, dried fruit pulp, especially dried apple pulp, is added to soya flour, either finely or coarsely ground, and the mixture is cooked in sheets and reduced to flakes by any suitable method. This dry cereal is a palatable food and has a superior keeping quality.

In order to illustrate an example of producing an animal feed by this process, the following example is given:

Example I

One pound of dried, ground tomato or apple pomace is thoroughly mixed with ten pounds of soybean oil meal, either pressed meal or solvent extraction meal, and, if desired, some water may be added to moisten the material. The resulting blend is allowed to stand for thirty minutes, after which any moisture present is removed by heating.

In the so-called "wet process" disclosed in Figure 2, fruit pomace or pulp, such as grated apples or crushed tomatoes, is added to the protein containing material and the ingredients are thoroughly mixed. If fruit juices are not present in sufficient quantities to thoroughly moisten the material, additional moisture can be supplied by adding a sufficient quantity of water. The resulting blend is dried by heating. Preferably, before heating, this blend is allowed to stand for a period of time. A dried fruit pomace may be used in this process if an additional quantity of water is added. Moreover, if desired, these materials may be cooked to form an edible pre-digested paste. Preferably, this cooking is conducted at temperatures of 212° F. or more by the autoclave method.

This treatment not only prevents deterioration and spoiling, but also causes a partial pre-digestion of the nutritive substances present in the treated protein containing material, thereby causing this food to be more readily assimilated by animal organisms.

In addition, by means of this treatment, a palatable flaked cereal can be produced by adding a grated fruit, such as grated apple, to the soya flour, either finely or coarsely ground, to form a paste. This dough may be dried in the form of sheets by any suitable process, such as passing between hot rollers, and is then reduced to flake size.

The following examples disclose various soya materials which can be treated by this process to prevent spoilage and deterioration and to cause pre-digestion. However, this process can be adapted for the treatment of other protein containing materials, such as meat scrap, tankage, cotton or linseed oil meal. The product produced in Example II is suitable for human consumption, while the product produced in Example III is intended for use as an animal food.

Example II

Two pounds of pulped apples or tomatoes are thoroughly mixed with one pound of processed, ground soybeans or soybean flour, the blend is allowed to stand thirty minutes, and the mixture is then dried by heating.

Example III

Ninety pounds of crushed, raw soybeans are intimately mixed with ten pounds of tomato or apple pomace to which some water is added, the blend is allowed to stand for one hour, and the mixture is then dried by heating.

In this connection it should be noted that except in the production of edible pre-digested paste materials, the heating step contemplated in the processes disclosed in this application is employed only for the purpose of removing moisture and is, therefore, a drying step as distinguished from a cooking step. However, the moisture can be removed in any suitable manner. Moreover, pre-digestion is aided if a slow heat is applied in order to lengthen this drying step.

As has been previously mentioned, the selected protein containing material should be in divided form. This reduction in size may be accomplished by granulation or any other suitable method. Moreover, the process is aided if the dried fruit or pulp is reduced in size. For example, if apples are used, it is advantageous to grate this fruit before it is added to the mixture.

While for purposes of illustration I have only disclosed two methods for treating protein containing materials to prevent deterioration and spoilage and to promote pre-digestion and two types of fruit which may be employed in these processes, it is obvious that this invention is of greater scope and embraces broadly the idea of treating protein containing material with any acidic fruit to produce a pre-digested food having increased storage qualities. It is, therefore, to be understood that this invention is only to be limited by the prior art and the scope of the appended claim.

I claim:

The method of treating soya flour to retard deterioration, comprising adding to a selected soya flour an acidic fruit pulp selected from a group consisting of apples and tomatoes, said pulp being added in sufficient quantities to constitute at least 1% by weight of the total mixture, introducing sufficient water to thoroughly moisten the material, intimately mixing the soya material and the fruit pulp to form a paste, permitting the blend to stand for a period of time to permit pre-digestion of the nutritive substances in the soya material and to increase its storage properties and then slowly drying the mixture to remove the excess moisture whereby deterioration of the soya material is retarded.

ARTEMY ALEXIS HORVATH.